United States Patent [19]

Krishnan et al.

[11] Patent Number: 4,963,598
[45] Date of Patent: Oct. 16, 1990

[54] GAMMA RADIATION RESISTANT POLYCARBONATE COMPOSITIONS

[75] Inventors: Sivaram Krishnan, Pittsburgh; Richard E. Keegan, McMurray; Neil H. Nodelman; Charles E. Lundy, both of Pittsburgh, all of Pa.

[73] Assignee: Mobay Corporation, Pittsburgh, Pa.

[21] Appl. No.: 297,264

[22] Filed: Jan. 18, 1989

Related U.S. Application Data

[63] Continuation-in-part of Ser. No. /183,023, Apr. 18, 1988, abandoned.

[51] Int. Cl.⁵ .......................... C08K 5/54; C08K 5/15; C08K 5/10; C08K 5/06
[52] U.S. Cl. .................................. 523/137; 524/110; 524/265; 524/290; 524/367
[58] Field of Search ............... 524/110, 265, 268, 290, 524/367; 523/137

[56] References Cited

U.S. PATENT DOCUMENTS

| | | | |
|---|---|---|---|
| 4,451,641 | 5/1984 | Sublett et al. | 528/295.5 |
| 4,460,445 | 7/1984 | Rekers | 204/159 |
| 4,624,972 | 11/1986 | Nace | 523/136 |

FOREIGN PATENT DOCUMENTS 152012 8/1985 European Pat. Off. .

Primary Examiner—Lewis T. Jacobs
Attorney, Agent, or Firm—Joseph C. Gil; Aron Preis

[57] ABSTRACT

The invention relates to thermoplastic polycarbonate molding compositions which are rendered resistant to gamma-radiation by incorporating therewith about 0.1 to about 10 percent by weight of a stabilizing agent conforming to

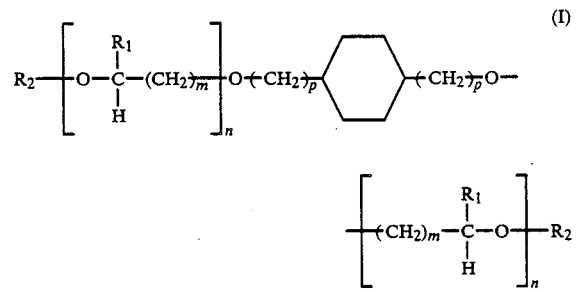

wherein $R_1$ denotes a hydrogen atom or a $C_1$–$C_4$ alkyl, $R_2$ denotes a hydrogen atom, a $C_1$–$C_{30}$ alkyl or acyl radical, silyl or pyranyl where said alkyl and acyl radicals may be either branched or linear, n is an integer of from 0 to 70, p is 0 or 1 and m is 1 to 4.

13 Claims, No Drawings

GAMMA RADIATION RESISTANT POLYCARBONATE COMPOSITIONS

This application is a Continuation-In-Part of Ser. No. 183,023 filed Apr. 18, 1988.

FIELD OF THE INVENTION

The invention is directed to polycarbonate molding compositions and more particularly, to thermoplastic compositions resistant to gamma radiation.

SUMMARY OF THE INVENTION

The invention relates to thermoplastic polycarbonate molding compositions which are rendered improved resistance to gamma-radiation by the incorporation therewith of about 0.1 to about 10 percent by weight of an end-capped compound conforming to

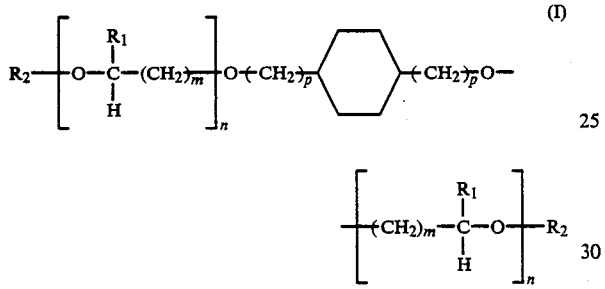

wherein $R_1$ denotes a hydrogen atom or a $C_1$-$C_4$ alkyl, $R_2$ denotes a hydrogen atom, a $C_1$-$C_{30}$ alkyl or acyl radical, silyl or pyranyl where said alkyl and acyl radicals may be either branched or linear, n is an integer of from 0 to 70, p is 0 or 1 and m is 1 to 4.

The compositions of the invention exhibit excellent resistance to yellowness and formation of haze which commonly characterize gamma irradiated articles molded from polycarbonate.

BACKGROUND OF THE INVENTION

Because of its physical and mechanical properties polycarbonate resins were found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. European Patent Application No. 152,012 disclosed a method for increasing the ionizing radiation resistance of polycarbonate by including in the composition a non-polymeric compound which is characterized by a strong oxidizing action and/or reaction at high reaction rate with active species such as E or OH radicals or hydrated electrons formed by ionizing radiation. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445. Copending U.S. patent application Ser. No. 67,670 filed June 26, 1987 relates to relevant technology.

DETAILED DESCRIPTION OF THE INVENTION

The composition of the invention comprises a polycarbonate resin and a stabilizing agent in an amount sufficient to enhance the resistance of the resin to yellowness upon exposure to gamma radiation. Preferably, the composition contains about 0.1 to 10.0, more preferably 0.5 to 5 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957 and 2,248,817; French Patent No. 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

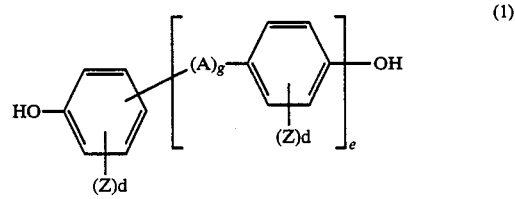

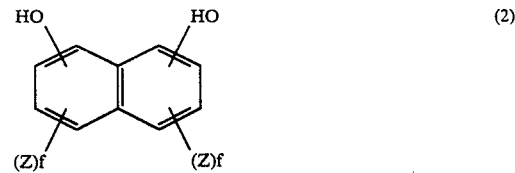

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

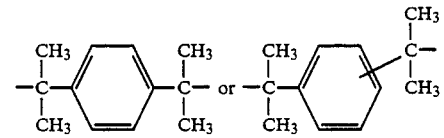

e and g both denote the number 0 to 1; Z denotes F, Cl, Br or $C_1$-$C_4$-alkyl and if several Z radicals are substituents in one aryl radical, they may be identical or different one from the other; d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and a,a'-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, a,a'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, a,a'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften Nos. 1,570,533; 2,116,974 and 2,113,374; British Patent Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of Mobay Corporation of Pittsburgh, Pa.

The stabilization agent in accordance with the present invention conforms structurally to

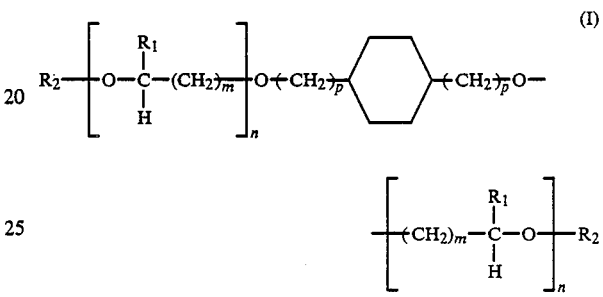

wherein $R_1$ denotes a hydrogen atom or a $C_1$–$C_4$ alkyl, $R_2$ denotes a hydrogen atom, a $C_1$–$C_{30}$ alkyl or acyl radical, silyl or pyranyl where said alkyl and acyl radicals may be either branched or linear, n is an integer of from 0 to 70, preferably 1 to 70 p is 0 or 1 and m is 1 to 4.

The end-capped stabilizer of the invention may be readily synthesized following conventional procedures. For instance, a hydroxy terminated polyol precursor may be prepared using known techniques such as alkylene oxide polymerization. The examples (1 and 2) demonstrate the preparation of the preferred embodiments of an end-capped polyether.

The invention is further illustrated but is not intended to be limited by the following examples in which all parts and percentages are by weight unless otherwise specified.

EXAMPLES

EXAMPLE 1

Preparation of cyclohexane dimethanol initiated polypropylene glycol with dihydropyran end-capping.

300 gms of a polyol ($M_w$ about 2000; and hydroxy number of about 45–60) conforming to formula (I) wherein $R_1 = CH_3$, $R_2 = H$ and $m = 1$ were introduced along with 26.4 gm of dihydropyran and 0.25 gm of p-toluene sulfonic acid (catalyst) in about 300 ml of cyclohexane. The reaction temperature was raised to 65° C. and held at that level for 10 hours and then allowed to cool. A stoichiometric amount of trimethylamine was added to neutralize the acid catalyst. The resulting liquid was then filtered and vacuum distilled to remove the residual solvent.

EXAMPLE 2

Preparation of trimethylchlorosilane and end-capped cyclohexane dimethanol initiated polypropylene glycol.

The reaction scheme is shown below

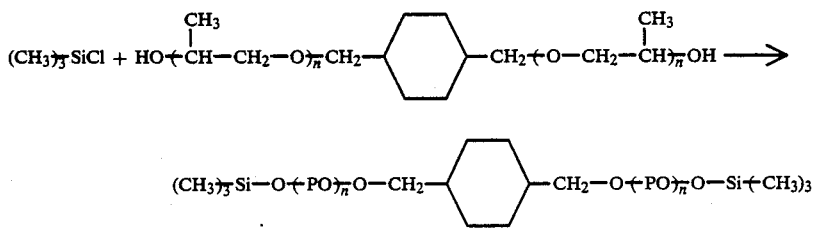

where (PO) represents propylene oxide units.

The polyol (300 gm) was mixed with hexane (450 ml) and triethylamine (30.3 gm) was added as a catalyst and hydrogen chloride scavenger. The trimethylchlorosilane (65.78 gm) was added dropwise to the mixture upon which addition a cloudy solution was immediately formed. The mixture was stirred for 5 hours and filtered. The product was a liquid.

The end-capped polyether of the invention was incorporated in a polycarbonate resin and specimens were molded from the composition. The specimens were subjected to gamma radiation and the change in yellowness index was measured and is reported below. The effect of the radiation was determined on specimens which were injection molded at 550° F. and at 650° F.

In all the experiments, the polycarbonate was Makrolon FCR resin which is a bisphenol-A based polycarbonate having a melt flow rate of about 19 gm/10 min per ASTM D-1238 - a product of Mobay Corporation. In Table 1 there is shown the effect of gamma radiation on specimens molded from polycarbonate resin which contained no stabilizing additives.

TABLE 1

EFFECT OF GAMMA RADIATION STABILIZERS IN POLYCARBONATE COMPOSITIONS

| STABILIZER CONC. (%) | RADIATION DOSE[1] | YELLOWNESS INDEX* | YELLOWNESS INDEX** | ΔYI* | ΔYI** |
|---|---|---|---|---|---|
| MAKROLON 2400 | 0.0 | 4.07 | 4.17 | — | — |
| Containing no | 2.5 | 12.10 | 10.35 | 8.03 | 6.18 |
| Additives | 5.0 | 16.89 | 13.98 | 12.82 | 9.81 |

[1]Dose in megarads
*Molded at 550° F.
**Molded at 650° F.

In Table 2 there is shown the effect of gamma radiation on specimens made from polycarbonate compositions which contain the OH-terminated polyether, the precursor of the end capped polyether of the invention.

TABLE 2

EFFECT OF GAMMA RADIATION STABILIZERS IN POLYCARBONATE COMPOSITIONS

| STABILIZER CONC. (%) | RADIATION DOSE[1] | YELLOWNESS INDEX* | YELLOWNESS INDEX** | ΔYI* | ΔYI** |
|---|---|---|---|---|---|
| 0.5 | 0.0 | 2.59 | 2.94 | — | — |
|  | 2.5 | 5.20 | 5.54 | 2.61 | 2.60 |
|  | 5.0 | 7.25 | 7.41 | 4.66 | 4.47 |
| 1.0 | 0.0 | 2.68 | 2.92 | — | — |
|  | 2.5 | 4.72 | 5.07 | 2.04 | 2.15 |
|  | 5.0 | 6.74 | 6.77 | 4.06 | 3.85 |

[1]Dose in megarads
*Molded at 550° F.
**Molded at 650° F.

Tables 3 and 4 show the corresponding effects on polycarbonate molded specimens which were stabilized in accordance with the invention. The efficacy of the stabilizer prepared in Example 1 is shown in Table 3.

TABLE 3

EFFECT OF GAMMA RADIATION STABILIZERS IN POLYCARBONATE COMPOSITIONS (DIHYDROPYRAN TERMINATED)

| STABILIZER CONC. (%) | RADIATION DOSE[1] | YELLOWNESS INDEX* | YELLOWNESS INDEX** | ΔYI* | ΔYI** |
|---|---|---|---|---|---|
| 0.5 | 0.0 | 2.61 | 2.91 | — | — |
|  | 2.5 | 5.76 | 5.51 | 3.15 | 2.60 |
|  | 5.0 | 7.92 | 7.24 | 5.31 | 4.33 |
| 1.0 | 0.0 | 2.51 | 2.07 | — | — |
|  | 2.5 | 4.97 | 5.51 | 2.46 | 3.44 |
|  | 5.0 | 7.41 | 6.76 | 4.90 | 4.69 |

[1]Dose in megarads
*Molded at 550° F.
**Molded at 650° F.

Table 4 reports the stabilizing efficacy of the stabilizer prepared in accordance with Example 2.

TABLE 4

EFFECT OF GAMMA RADIATION STABILIZERS IN POLYCARBONATE COMPOSITIONS (TRIMETHYLSILANE TERMINATED)

| STABILIZER CONC. (%) | RADIATION DOSE[1] | YELLOWNESS INDEX* | YELLOWNESS INDEX** | ΔYI* | ΔYI** |
|---|---|---|---|---|---|
| 0.5 | 0.0 | 2.73 | 3.10 | — | — |
|  | 2.5 | 6.08 | 5.25 | 3.35 | 2.15 |
|  | 5.0 | 8.61 | 7.79 | 5.88 | 4.69 |
| 1.0 | 0.0 | 2.90 | 3.08 | — | — |
|  | 2.5 | 5.71 | 4.75 | 2.81 | 1.67 |
|  | 5.0 | 8.44 | 6.86 | 5.44 | 3.78 |

[1]Dose in megarads
*Molded at 550° F.
**Molded at 650° F.

While the yellowness index of polycarbonate compositions containing the end-capped version of the stabilizer is comparable to that of the compositions of the invention the later is further characterized by its superior thermal stability and virtual freedom from splay.

EXAMPLE 3

Additional embodiments of the invention were prepared and evaluated. The preparation of polycarbonate compositions containing 1.0% by weight of a stabilizer followed conventional procedures and the molded parts were exposed to gamma radiation as noted below and their yellowness index determined. The results are tabulated below.

TABLE 5

| Composition | Yellowness Index After gamma radiation (M rads) | | |
| --- | --- | --- | --- |
| | 0 | 3.5 | 5.0 |
| Polycarbonate resin[1] (Control) | 3.35 | 13.05 | 26.31 |
| Polycarbonate + 1% of Cyclohexanedimethanol bis-DHP[2] | 3.79 | 8.98 | 12.93 |
| Polycarbonate + 1% of cyclohexane-diol bis-DHP[2] | 3.25 | 7.42 | N.D.[3] |

[1]Homopolycarbonate of bisphenol A.
[2]Dihydropyran termination.
[3]Not determined.

The compositions of the invention may be prepared by following conventional procedures for the preparation of polycarbonate molding compositions. The stabilizing agent may be introduced by directly mixing it with the polycarbonate. Alternately, the stabilizer may be introduced to the reaction vessel of the polycarbonate resins.

Other conventional additives may also be incorporated in the composition for their art-recognized utility. These include release agents, plasticizers, stabilizers, antioxidants, fillers, reinforcements and the like.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising
   (i) an aromatic polycarbonate resin and about 0.1 to 10.0% of
   (ii) a stabilizing agent conforming to

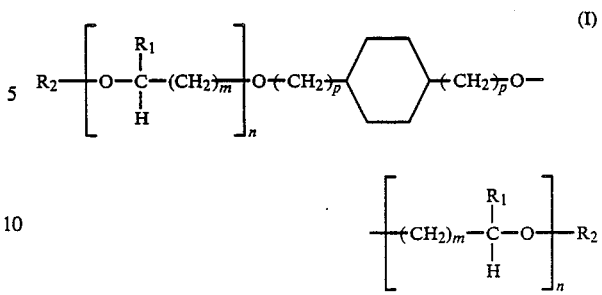

wherein $R_1$ denotes a hydrogen atom or a $C_1$–$C_4$ alkyl, $R_2$ denotes a hydrogen atom, a $C_1$–$C_{30}$ alkyl or acyl radical, silyl or pyranyl where said alkyl and acyl radicals are either branched or linear, n is an integer of from 1 to 70, p is 0 or 1 and m is 1 to 4.

2. The composition of claim 1 wherein said (ii) is present in an amount of about 0.5 to 5 percent relative to the weight of the composition.

3. The composition of claim 1 wherein said $R_2$ is a pyran radical.

4. The composition of claim 1 wherein said $R_2$ is a silane radical.

5. The composition of claim 1 wherein said polycarbonate is a homopolymer based on bisphenol A.

6. The composition of claim 1 wherein said $R_1$ is a hydrogen atom.

7. The composition of claim 1 wherein said $R_1$ is a $C_1$–$C_4$ alkyl radical.

8. The composition of claim 1 wherein said $R_2$ is a branched or linear $C_1$–$C_{30}$ acyl radical.

9. The composition of claim 6 wherein said $R_2$ is a hydrogen atom.

10. The composition of claim 1 wherein said $R_2$ is a branched or linear $C_1$–$C_{30}$ alkyl radical.

11. A polycarbonate molding composition comprising
    (i) an aromatic polycarbonate resin and about 0.1 to 10.0% of
    (ii) a stabilizing agent conforming to

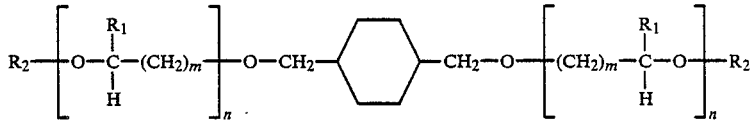

wherein $R_1$ denotes a hydrogen atom or a $C_1$–$C_4$ alkyl, $R_2$ denotes a hydrogen atom, a $C_1$–$C_{30}$ alkyl or acyl radical, silyl or pyranyl where said alkyl and acyl radicals may be either branched or linear, n is an integer of from 1 to 70 and m is 1 to 4.

12. The composition of claim 1 wherein p is 0, n is 0 and $R_2$ is a pyranyl radical.

13. The composition of claim 1 wherein p is 1, n is 0 and $R_2$ is a pyranyl radical.

* * * * *